United States Patent [19]

Simon

[11] Patent Number: 4,513,066

[45] Date of Patent: Apr. 23, 1985

[54] THIN-FILM, HIGH PRESSURE FUEL CELL

[75] Inventor: Donald R. Simon, East Windsor, N.J.

[73] Assignee: Prutec Limited, London, England

[21] Appl. No.: 480,229

[22] Filed: Mar. 30, 1983

[51] Int. Cl.³ .............................................. H01M 8/08
[52] U.S. Cl. ...................................... 429/42; 429/46
[58] Field of Search ..................... 429/40, 21, 41, 42, 429/43, 30, 12, 13, 25, 44, 34, 46

[56] References Cited

U.S. PATENT DOCUMENTS

| | | | |
|---|---|---|---|
| 2,716,670 | 8/1955 | Bacon | 429/34 |
| 2,928,783 | 3/1960 | Bacon | 204/283 |
| 2,969,315 | 1/1961 | Bacon | 204/284 |
| 3,167,457 | 1/1965 | Bacon | 252/425.3 |
| 3,437,525 | 4/1969 | Hauel et al. | 429/34 |
| 3,480,538 | 11/1969 | Sturm | 429/40 |
| 3,615,862 | 10/1971 | Roth et al. | 429/40 |
| 3,839,091 | 10/1974 | Bloomfield et al. | 429/34 |
| 4,001,039 | 1/1977 | Elmore et al. | 429/40 |
| 4,048,383 | 9/1977 | Clifford | 429/44 |
| 4,064,322 | 12/1977 | Bushnell et al. | 429/41 |
| 4,215,183 | 7/1980 | MacLeod | 429/41 |
| 4,362,790 | 12/1982 | Blanchart et al. | 429/42 |

OTHER PUBLICATIONS

*Fuel Cell Systems*, Gould Editor, 1965 pp. 106–112.
A. E. Moos, "Fuel–Cells–Technology and Economic Study", Apr. 1960, SAE Paper 159D.
F. T. Bacon, "The High–Pressure Hydrogen–Oxygen Fuel Cell", 1960, Fuel Cells pp. 51–77.
P. Vouros et al., "Thin Film Silver Electrodes for Fuel Cells", Nov.–Dec. 1968, Electrochemical Technology.

Primary Examiner—Anthony Skapars
Attorney, Agent, or Firm—Mark Dryer

[57] ABSTRACT

A thin-film, high pressure fuel cell comprising at least one oxygen electrode and at least one hydrogen electrode separated by thin-film hydrophilic membranes wetted with a solution of electrolyte, each electrode comprising a hydrophobic porous membrane coated with a thin film of noble metal catalyst and having conducting elements associated therewith, said arrangement of electrodes, membranes and conducting elements being subjected to a gas pressure of 500 to 20,000 psi.

6 Claims, 5 Drawing Figures

THIN-FILM, HIGH PRESSURE FUEL CELL

BACKGROUND OF THE INVENTION

1. Field of the Invention

This invention relates to improvement in fuel cells. More particularly, the invention is concerned with a thin-film, high pressure fuel cell.

A fuel cell is a device in which energy from chemical reactions is made available as electric current.

An electrolyzer is a device wherein electrical energy is used to provide chemical reagents adapted to react chemically to regenerate electrical energy. When these devices are combined in a single package, the resulting device is a regenerative fuel cell.

2. Description of the Prior Art

The original concept for a regenerative electrochemical process in which electrical energy is the direct input and output of a chemical system can be traced to the work of "Grove" in 1839, and the principle of the fuel cell was formulated by W. Oswald as long ago as 1894.

However, only in recent years has there been any real progress in bringing the technology into any semblance of practicality. Thus, modern fuel cell development dates from the 1930's when F. T. Bacon developed a cell which operated on high-purity oxygen and hydrogen. Most developments from then have been modifications of the Bacon fuel cell.

Many of the prior art systems which utilize the $H_2/O_2$ regenerative process employ electrodes which consist of porous media which provide a region where a three phase interface can exist in stable form (i.e., gas, liquid, solid) and catalytic electrochemical reaction can take place. These electrodes are expensive, physically unstable when used cyclically, subject to flooding, and limited in efficiencies at current densities of practical value. Thus, many prior art patents aimed at improving the nature of the electrodes. See, for examples, U.S. Pat. Nos. 2,716,670, 2,928,783, 2,969,315 and 3,167,457, all to Bacon.

By 1960 it was appreciated that temperature and pressure were significant to the performance of a fuel cell and A. M. Moos' "Fuel-Cells-Technical and Economic Study" SAE Paper 159D (April 1960) had shown the feasibility of cells operating at 600° F. and 1000 psi.

A comprehensive review of fuel cell technology in 1960 is to be found in an article by F. T. Bacon entitled, "The High-Pressure Hydrogen-Oxygen Fuel Cell", appearing on pages 51–77 in "Fuel Cells" published by Reinhold (1960). In this article the author discusses the hydrogen-oxygen fuel cell using a potassium hydroxide electtrolyte and concludes that porous nickel is the best catalyst metal because of low cost, good corrosion resistance and superior performance under current drain. He discusses the improvement of cell performance with increased temperature and pressure up to 240° C. and 1075 psi. Reference is made to cells which would withstand a pressure of 3000 psi but no performance data are given for such theoretical cells.

The article indicates that fuel cells of the type described have a number of advantages, for example: (1) the ability to take large overloads at reduced efficiency without damage; (2) silence and freedom from vibration in operation; (3) lack of moving parts; (4) the only waste material produced is water; and (5) the charging process merely consists of refilling with the two gases. However, it concludes that the application of such fuel cells is limited due to factors such as size and weight and possibly cost.

SUMMARY OF THE INVENTION

The present invention provides a fuel cell which may be manufactured at competitive costs, be capable of high specific power densities, and has acceptable lifetime in the marketplace.

Such a fuel cell possesses the traditional advantages mentioned above while reducing or eliminating the disadvantages experienced in prior art fuel cells.

This has been achieved by a novel combination which utilizes various procedures and techniques which have been separately hinted at or proposed in theory in the prior art but, heretofore, have never been combined into a workable combination.

For example, it has been found that the most efficient catalyst metals for fuel cells are the noble metals, particularly platinum, but most prior art workers, see, for example, the Bacon article supra, have avoided the use of platinum because of the high cost of this metal. The objection of high cost is avoided in the present invention by using the catalyst metal, preferably platinum, in the form of a very thin film, or the order of 250 to 1000 A, coated on a thin microporous membrane as hereinafter described. However, the use of very thin films of platinum, while reducing the cost, introduces the problem of decrease in effective catalytic surface area. This problem is overcome, according to the present invention, by eliminating the three-phase interface (solid, liquid, gas) system common to prior art fuel cells and bringing the oxygen/hydrogen gases into direct contact with the catalyst surface by dissolution in the electrolyte, preferably aqueous potassium hydroxide, under high pressure and, optionally, high temperature. The elimination of the three-phase interface system also overcomes the flooding problem, caused by the formation of water, experienced in prior art cells.

Thus, in accordance with the present invention, there is provided a fuel cell comprising at least one oxygen electrode and at least one hydrogen electrode separated by thin-film porous hydrophilic membranes wetted with a solution of electrolyte, between which hydrophilic membrane and oxygen electrode and also between which hydrophilic membrane and hydrogen electrode there are located two electrically-conducting metal elements, each associated with of a hydrophobic porous membrane plated with a thin film of noble metal catalyst, the said thin films of catalyst each having a thickness of up to 1000 A, and said sequential arrangement of electrodes, membranes, electrolyte, conducting elements and catalyst films being subjected to a gas pressure of 500 to 20,000 psi whereby the oxygen and hydrogen gases go into solution in the electrolyte and electric current generated by the reaction of the gases at the surface of the catalysts is taken from the electrically-conducting elements.

The preferred noble metal for the thin-film catalyst is platinum.

The preferred electrolyte is aqueous potassium hydroxide.

The electrically-conducting elements are preferably in the form of contact rings having terminal strips integral therewith.

A preferred embodiment of the invention is a fuel cell comprising an outer canister adapted to withstand high pressure, an inner tube mounted within the said canister and surrounding, in combination, a gas impermeable elastomeric bladder containing oxygen gas, said bladder being attached to a bottom flange having an opening leading to an inner assembly located between said bottom flange and a top flange to which it is secured, the said inner assembly comprising two outer hydrophobic membranes, each plated on its inner side with a thin film of platinum catalyst, over a thin film of conductive metal, two inner electrically conducting contact rings, within which is mounted at least one hydrophilic membrane wetted with an aqueous solution of potassium hydroxide as electrolyte, and means for introducing hydrogen gas under pressure into the said top flange.

BRIEF DESCRIPTION OF THE DRAWINGS

A fuel cell according to the invention is illustrated schematically in the accompanying drawings in which.

Figure 1:
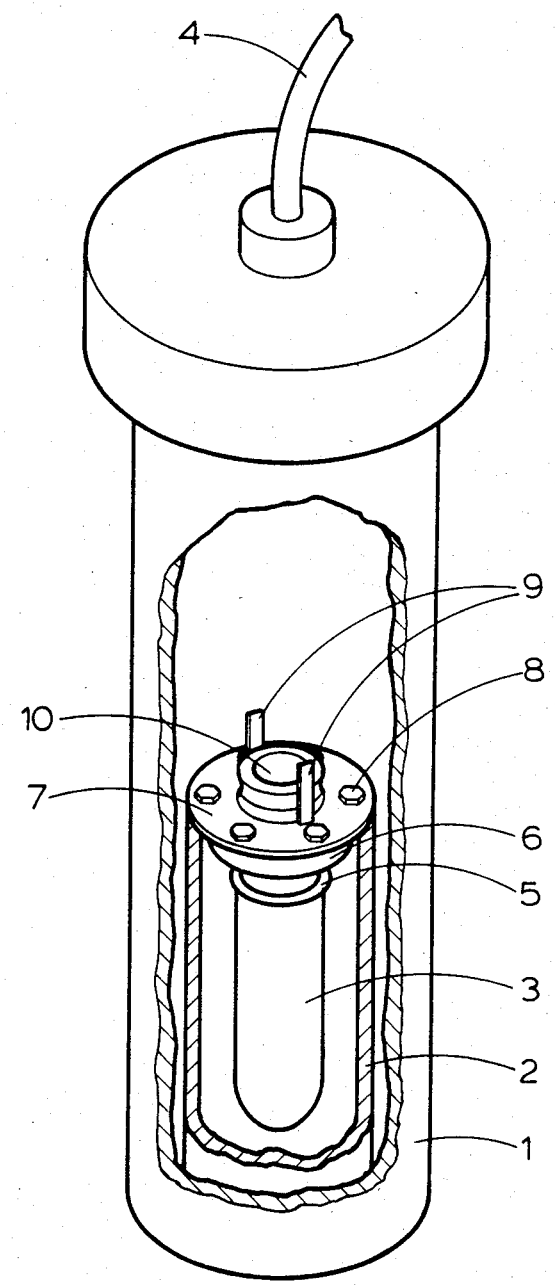
FIGS. 1 and 2 illustrate a high pressure fuel cell assembly.

The fuel cell illustrated in FIG. 1 of the drawings is a high pressure hydrogen/oxygen fuel cell which comprises an outer canister 1 in which is mounted an inner bladder tube 2. Located within the bladder tube is a gas impermeable bladder 3 into which oxygen gas is introduced. This bladder supplies oxygen to the oxygen electrode. Hydrogen is introduced under high pressure through line 4. The bladder 3 containing oxygen is sealed, via O-ring 5, to one side of an inner assembly located between a bottom flange 6 and a top flange 7. The flanges are secured together by suitable means, such as bolts 8. Protruding through suitable apertures in the top flange 7 are terminal strips 9. Hydrogen gas is introduced into the said inner assembly through port 10.

Figure 2:
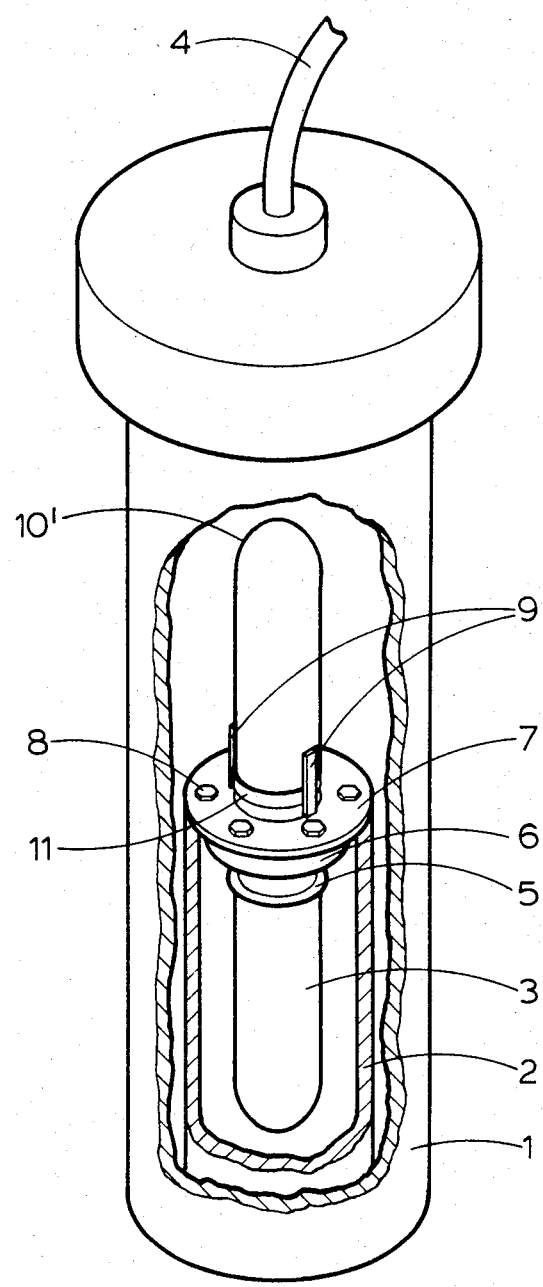

The fuel cell illustrated in FIG. 2 is an alternative construction. Items 1 through 3 and 5 through 9 are identical to those shown in FIG. 1. Mounted to the top flange 7 is a gas impermeable bladder 10[1] into which hydrogen is introduced. This bladder supplies hydrogen gas to the hydrogen electrode, and is sealed, via O-ring 11, to the top flange. Nitrogen is introduced under high pressure through line 4.

Figure 3:
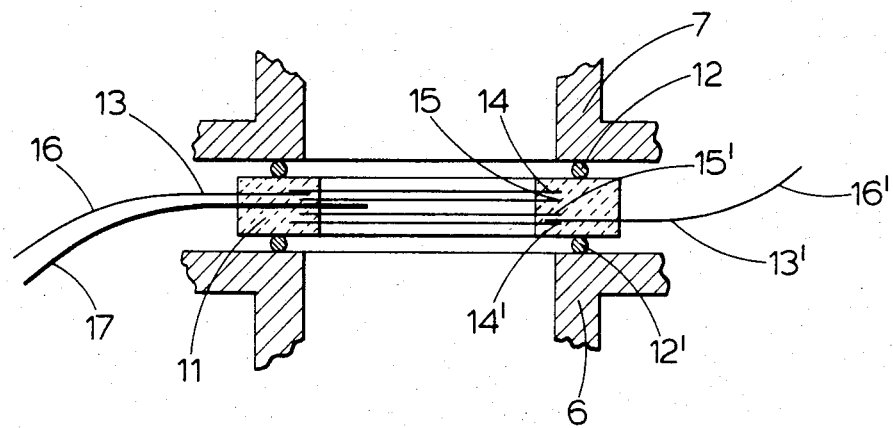
FIG. 3 illustrates the various elements forming the inner assembly of the fuel cell.

Referring to FIG. 3, this illustrates the various elements of the inner assembly of the fuel cell located between the top flange and bottom flange illustrated in FIG. 1. The said elements of the inner assembly, arranged sequentially from the outside to the center are, respectively, O-rings 12, 12[1]; molded container 11; hydrophobic membranes 14, 14[1], plated on one side with a thin film of platinum catalyst. The manner of the plating is described in more detail hereinafter. Adjacent to the plated hydrophobic membranes are contact rings 13, 13[1] made of an electrically-conducting metal and having as extensions therefrom electrical conductors 16, 16[1]. Within the hydrophobic membranes are mounted hydrophilic membranes 15, 15[1]. Between the hydrophobic membranes is mounted an electrolyte feed tube 17. The nature of these various elements is described in more detail below with reference to the operation of the fuel cell.

A preferred embodiment of the fuel cell according to the invention comprises a thin layer of material, such as a porous hydrophilic plastic membrane, which contains a liquid electrolyte such as an aqueous solution of potassium hydroxide; two thin layers of porous material, such as a hydrophobic plastic membrane, that allows passage of the reactant gases; two thin films of electrode material which may also act as catalysts, the thin films being deposited on either the hydrophilic or hydrophobic membranes and typically being of platinum and of thickness of up to 1000 A, more particularly 200 to 1000 A. The complete cell, therefore, comprises at least 3 plastic membranes and two metal films in close proximity, the total thickness of the cell being approximately 0.013 in.

The cell may be operated at high pressures (e.g., 500 to 20,000 psi) which permits current densities in the order of 1 to 10 mA/cm$^2$ whilst maintaining high efficiency and long life expectancy.

The benefits of the cell are twofold, that is, the economic constraint of the catalyst cost is removed and the severe operating constraints imposed by a three phase interface at the electrode is removed.

In operation, the fuel cell assembly illustrated in the drawings and described above is mounted in the high-pressure canister and the lower bladder is filled with oxygen. Hydrogen is introduced through the top cover of the canister as in FIG. 1, and floods the entire chamber, including the exposed surface of the cathode membrane. To reduce the risk of hydrogen diffusing through the baldder into the oxygen supply, the tank is filled with water to a level which keeps the bladder submerged at all times.

In the alternative construction, shown in FIG. 2, hydrogen is introduced into the upper bladder. Nitrogen floods the entire volume of the chamber above the water and external to the upper bladder.

The molded container 1, maintains a 0.010 in. distance between the electrodes. This space between the electrodes contains two 0.005 in. thick membranes of hydrophilic plastic material, preferably microporous polypropylene. These membranes 15, 15[1] act as wicking agents, absorbing the potassium hydroxide electrolyte and distributing it evenly to the electrode surfaces.

It is envisaged that a fully operational prototype thin film cell will utilize only one of these membranes sandwiched directly between the electrodes as an integral part of the electrolyte circulation system. This would reduce the total cell thickness to approximately 0.007 in.

The hydrophilic membranes are surrounded by conductive contact rings, over which are placed the thin film electrodes with their platinum plated sides facing each other. The active electrode area is 2.85 cm$^2$. The entire assembly is then encased in a molded container, said container being sandwiched between two rubber O-rings and clamped between the PTFE outer flanges of the cell.

The thin film electrodes are formed from thin discs of microporous polypropylene, 2500 A thick, coated on one side with a film of nickel, 1000 A thick on which is deposited a film of platinum, 1000 A thick. The substrate material is hydrophobic but sufficiently porous to allow the transport of ions.

Performance of the assembled fuel cell described above was initially evaluated at atmospheric pressure. Hydrogen and oxygen were supplied to the electrode surfaces by latex bladders which can hold sufficient volumes of gas at less than 1 lb/in$^2$ gauge pressure. The bladders were first evacuated, and the potential across the cell was verified to be nearly zero. Upon injection of gas into the bladders, open circuit potential rose to a value from 1.025 V to 0.925 V,; dependent on electrode material. It was found that nearly one hour was required for the cell to stabilize at these maximum values.

Performance under resistive loads was also found to be sluggish, with power outputs taking several minutes to stabilize at low output levels, and failing to stabilize (constantly falling) at high levels. This is possibly due to limited gas flow through the microporous polypropylene membrane, having a pore size of 0.04 u, since power outputs were found to stabilize very quickly when gas was supplied at high pressures.

Figure 5:
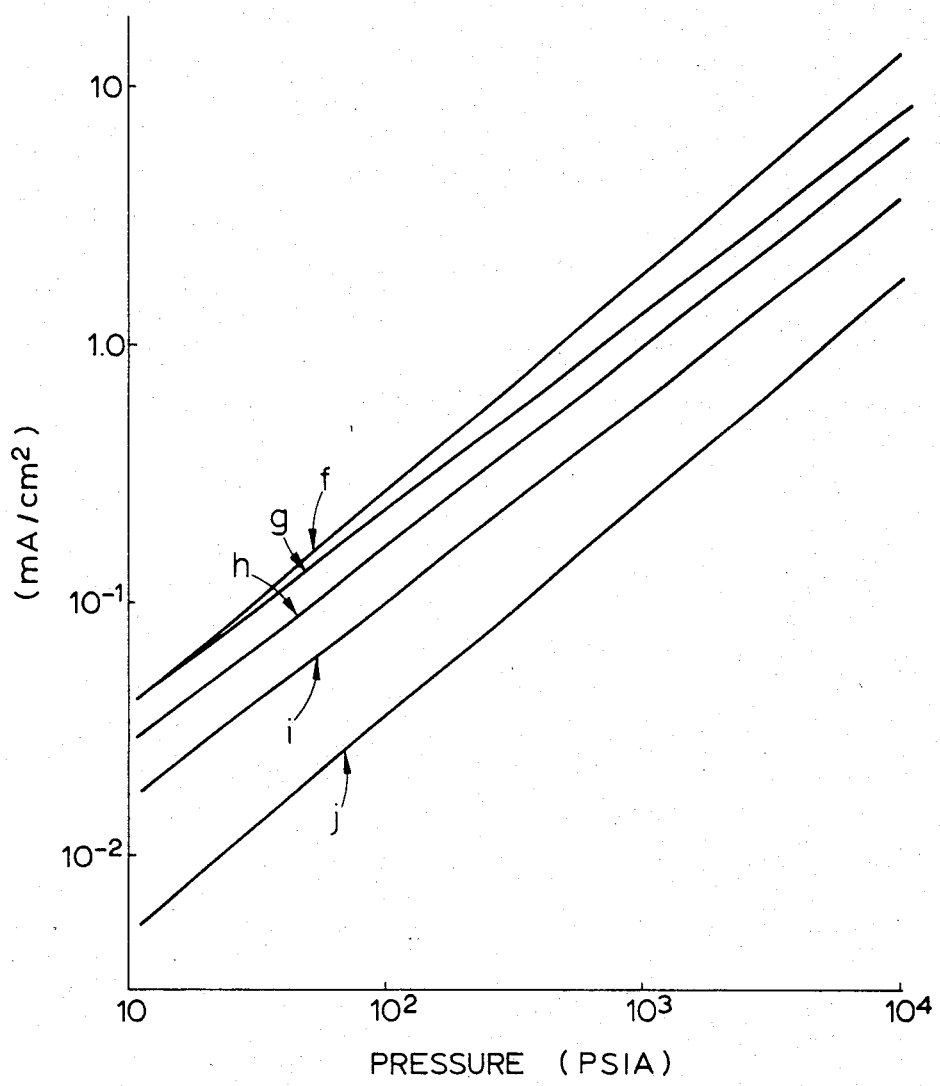
FIG. 5 is a graph illustrating performance at varying pressure.

FIG. 5 shows the effect of increasing cell pressure. Each of the curves f, g, h, i, and j in FIG. 5 shows, on a logarithmic scale, the increase in current density with increasing pressure at constant efficiencies of 55%, 60%, 65%, 70%, and 75%, respectively.

High-pressure performance tests were conducted up to 2000 lb/in$^2$ with platinum/nickel plated polypropylene electrode material installed in the cell. It was found that open circuit potential increased with rising pressure. More importantly, current output at constant operating efficiency also increased with rising pressure.

Figure 4:
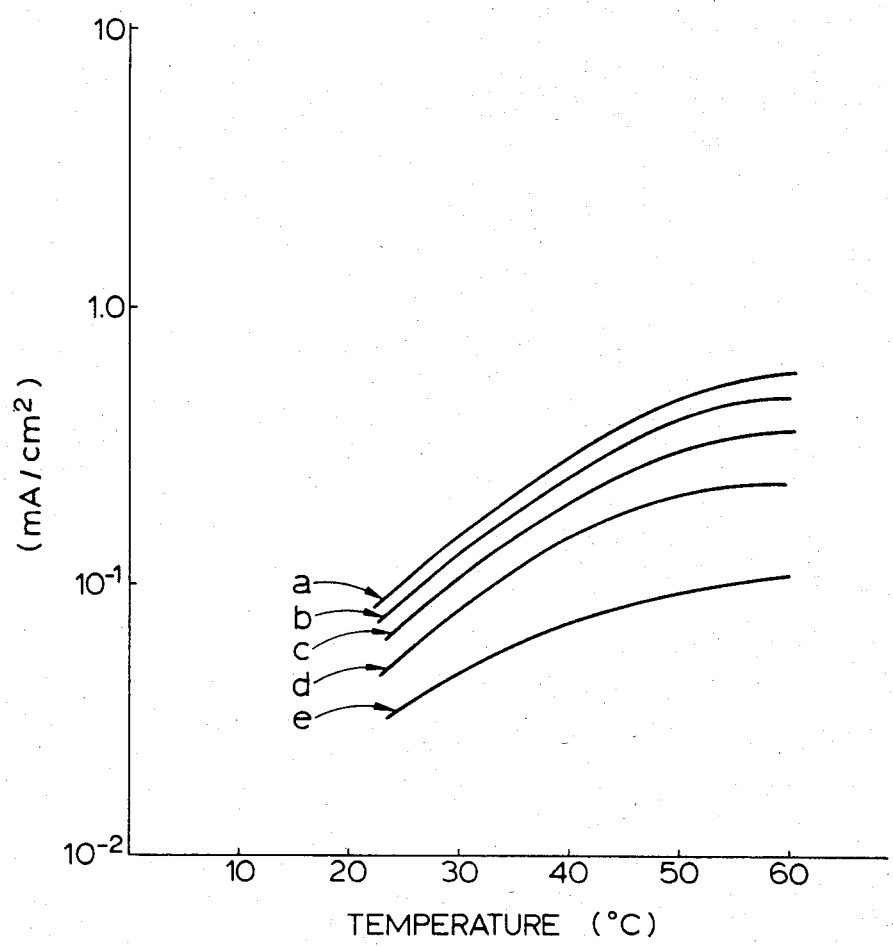
FIG. 4 is a graph illustrating the performance of a fuel cell according to the invention and showing the relationship between current density and temperature at constant pressure.

FIG. 4 shows the effect of increasing cell temperature. Each of the curves a, b, c, d, and e in FIG. 4 shows, on a logarithmic scale, the increase in current density with increasing temperature at constant efficiencies of 55%, 60%, 65%, 70%, and 75%, respectively. By raising cell temperature from 25° C. to 45° C., cell output was multiplied approximately 3 times at each respective efficiency level.

The above tests demonstrate that in a fuel cell according to the invention, porous polypropylene with plated catalytic surfaces performs well as electrodes. Furthermore, increases in operating efficiency at elevated pressures and temperatures have been shown to be significant.

The operation of the system at high pressure, such as 500 to 20,000 psi, preferable 3,000 to 20,000 psi, eliminates the mass transport limitation resulting from the small size of the cell and the use of thin film catalyst and permits current densities of the order (1 mA to 50 mA)/cm$^2$. The use of pressures of this order of magnitude places the fuel cell in a physical region never before investigated. The combination of thin-film construction plus high pressure results in operation with materials which could not have been deemed practical in the prior art. Such materials are significantly less expensive and allow overall economies of considerable import.

We claim:

1. A fuel cell comprising at least one oxygen electrode and at least one hydrogen electrode, the said electrodes being composed of, respectively, oxygen gas and hydrogen gas separated by thin-film porous membranes, wherein there is located between the oxygen gas and the hydrogen gas a hydrophilic porous membrane wetted with a solution of electrolyte, and between the said hydrophilic membrane and oxygen gas and also between the said hydrophilic membrane and hydrogen gas there are located two hydrophobic porous membranes each plated with a thin film of a noble metal catalyst and each being associated with an adjacent electrically-conducting metal element, the said thin films of catalyst each having a thickness of 200 to 1000 Å, and the said arrangement of gases, membranes, electrolyte, catalyst films and conducting elements being subjected to a gas pressure of 500 to 20,000 psi whereby the oxygen and hydrogen gases go into solution in the electrolyte and electric current generated by the reaction of the gases at the surface of the catalyst is taken from the electrically-conducting elements.

2. A fuel cell according to claim 1, in which the noble metal for the thin-film catalyst is platinum.

3. A fuel cell according to claim 1, in which the electrolyte is aqueous potassium hydroxide.

4. A fuel cell according to claim 1, in which the electrically conducting elements are in the form of contact rings having terminal strips integral therewith.

5. A fuel cell comprising an outer canister adapted to withstand high pressure, an inner tube mounted within the said canister and surrounding, in combination, a gas impermeable elastomeric bladder containing oxygen gas, said bladder being attached to a bottom flange having an opening leading to an inner assembly located between said bottom flange and a top flange to which it is secured, the said inner assembly comprising two outer hydrophobic membranes, each plated on its inner side with a thin film of platinum catalyst having a thickness of 200 to 1000 Å, over a thin film of conductive metal, two inner electrically conducting contact rings, within which is mounted at least one hydrophilic membrane wetted with an aqueous potassium hydroxide as electrolyte, and means for introducing hydrogen gas under pressure into the said top flange.

6. A fuel cell according to claim 5 in which the hydrophobic membranes plated with catalyst each comprise a disc of microporous hydrophobic plastic material on the order of 2500 A thick, coated with a film of nickel approximately 1000 A thick on which is deposited a film of platinum 200 A to 1000 A thick.

* * * * *